United States Patent
Shaked et al.

(10) Patent No.: US 10,264,097 B2
(45) Date of Patent: Apr. 16, 2019

(54) METHOD AND SYSTEM FOR INTERACTIVE AGGREGATION AND VISUALIZATION OF STORAGE SYSTEM OPERATIONS

(71) Applicant: SanDisk Technologies LLC, Plano, TX (US)

(72) Inventors: Tal Shaked, Pardes Hanna-Karkur (IL); Omer Gilad, Holon (IL); Liat Hod, Kfar Saba (IL); Eyal Sobol, Givat Shmuel (IL)

(73) Assignee: SanDisk Technologies LLC, Plano, TX (US)

( * ) Notice: Subject to any disclaimer, the term of this patent is extended or adjusted under 35 U.S.C. 154(b) by 237 days.

(21) Appl. No.: 15/226,661

(22) Filed: Aug. 2, 2016

(65) Prior Publication Data

US 2018/0041411 A1 Feb. 8, 2018

(51) Int. Cl.
| | | |
|---|---|---|
| *G06F 15/173* | (2006.01) | |
| *H04L 29/08* | (2006.01) | |
| *H04L 12/26* | (2006.01) | |

(52) U.S. Cl.
CPC ........... *H04L 67/32* (2013.01); *H04L 43/045* (2013.01); *H04L 67/1097* (2013.01)

(58) Field of Classification Search
USPC .................. 709/224, 201, 202, 203, 205
See application file for complete search history.

(56) References Cited

U.S. PATENT DOCUMENTS

| | | | |
|---|---|---|---|
| 8,271,618 B1 * | 9/2012 | Kridlo | ..................... H04L 67/06 709/219 |
| 9,294,710 B2 | 3/2016 | Lim et al. | |
| 2002/0144277 A1 | 10/2002 | Friedman et al. | |
| 2007/0083813 A1 | 4/2007 | Lui et al. | |

(Continued)

FOREIGN PATENT DOCUMENTS

| | | |
|---|---|---|
| EP | 2731015 A2 | 5/2014 |
| WO | WO 2012/075526 A2 | 6/2012 |

(Continued)

OTHER PUBLICATIONS

Application as Filed in U.S. Appl. No. 15/621,476, filed Jun. 13, 2017, 59 pages.

(Continued)

*Primary Examiner* — Lan Dai T Truong
(74) *Attorney, Agent, or Firm* — Brinks Gilson & Lione

(57) ABSTRACT

A method and system for interactive aggregation and visualization of storage system operations are provided. In one embodiment, the method is performed by a server in communication with a client and comprises: receiving, from the client, data regarding storage system operations that were performed by a storage system over time, wherein each storage system operation is classified according to an operation type; receiving, from the client, a size of a graph to be displayed on the client's display device to visualize the storage device operations, wherein the size of the graph is defined by a number of tiles; for each tile, aggregating the storage system operations by operation type and identifying (Continued)

a dominant operation type; and sending, to the client, the identified dominant operation type for each tile. Other embodiments are provided.

21 Claims, 12 Drawing Sheets

(7 of 12 Drawing Sheet(s) Filed in Color)

(56) References Cited

U.S. PATENT DOCUMENTS

| | | |
|---|---|---|
| 2007/0237227 A1 | 10/2007 | Yang et al. |
| 2008/0195369 A1 | 8/2008 | Duyanovich et al. |
| 2009/0287791 A1 | 11/2009 | Mackey |
| 2014/0075371 A1 | 3/2014 | Carmi |
| 2015/0177994 A1* | 6/2015 | Vucinic ................ G06F 3/0613 711/103 |
| 2015/0215245 A1* | 7/2015 | Carlson .............. G06F 3/04883 715/752 |
| 2015/0262556 A1* | 9/2015 | Edwall .................... G09G 5/14 345/428 |
| 2017/0109004 A1 | 4/2017 | Ghosh et al. |
| 2017/0371968 A1* | 12/2017 | Horowitz .......... G06F 17/30867 |

FOREIGN PATENT DOCUMENTS

| | | |
|---|---|---|
| WO | WO 2014/166523 A1 | 10/2014 |
| WO | WO 2015/174976 A1 | 11/2015 |

OTHER PUBLICATIONS

Application as Filed in U.S. Appl. No. 15/621,460, filed Jun. 13, 2017, 58 pages.
Non-Final Office Action from U.S. Appl. No. 15/621,476 dated Mar. 27, 2018, 14 pages.
International Search Report and Written Opinion for Application No. PCT/US2018/019521 dated Jun. 26, 2018, pp. 1-15.
International Search Report and Written Opinion in Application No. PCT/US2018/019525 dated Jun. 26, 2018, pp. 1-16.
Notice of Allowance from U.S. Appl. No. 15/621,476 dated Jul. 26, 2018, pp. 1-7.

* cited by examiner

METHOD AND SYSTEM FOR INTERACTIVE AGGREGATION AND VISUALIZATION OF STORAGE SYSTEM OPERATIONS

BACKGROUND

Storage systems, such as solid-state drives (SSDs) embedded in a mobile device, such as a phone, tablet, or wearable device, can execute many input/output operations (e.g., read, write, trim, and flush) during use of the mobile device. The operations may further include characteristics, such as timestamps on initiation and completion, and peripheral data, such as power state and aggregate queue depth. Analysis of these input/output commands and their characteristics can be used to design and implement algorithms for data storage. In operation, an application running in the storage system can log the various operations that take place, and this log can be analyzed by a computing device. In data analysis environments for storage workloads, there are often millions of individual data points that represent specific characteristics of the I/O input/output operations sent from the mobile device (host) to the storage system, and vice versa.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 7 is an address-by-operation graph of an embodiment with a user-selected area highlighted for zoom-in.

DETAILED DESCRIPTION OF THE PRESENTLY PREFERRED EMBODIMENTS

Overview

Figure 1A:
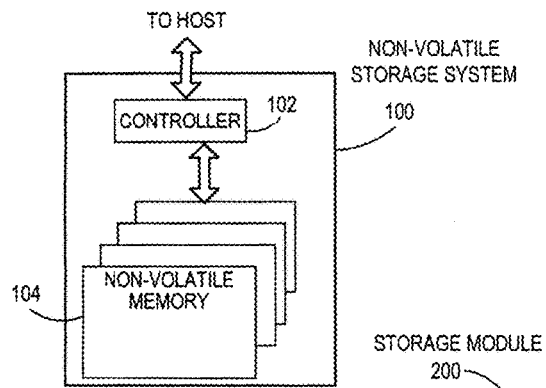
FIG. 1A is a block diagram of a non-volatile storage system of an embodiment.

By way of introduction, the below embodiments relate to a method and system for interactive aggregation and visualization of storage system operations. In one embodiment, a method for interactive aggregation and visualization of storage system operations is provided that is performed in a server in communication with a client. The method comprises: receiving, from the client, data regarding storage system operations that were performed by a storage system over time, wherein each storage system operation is classified according to an operation type; receiving, from the client, a size of a graph to be displayed on the client's display device to visualize the storage device operations, wherein the size of the graph is defined by a number of tiles; for each tile, aggregating the storage system operations by operation type and identifying a dominant operation type; and sending, to the client, the identified dominant operation type for each tile.

In some embodiments, the graph is an address-by-operation graph.

In some embodiments, the graph is a latency-by-operation graph.

In some embodiments, the graph is of a number of a peak input-output operations by second.

In some embodiments, the method further comprises receiving zoom-in coordinates from the client; for each tile within the zoom-in coordinates, re-identifying the dominant operation type; and sending, to the client, the re-identified dominant operation type for each tile.

In some embodiments, the method further comprises receiving, from the client, a location of a user-selected tile on the graph; and sending, to the client, information about one of the following: a number of storage system operations per operation type in the user-selected tile, if there is more than one operation in the user-selected tile; and detail on the operation in the user-selected tile, if there is only one operation in the user-selected tile.

In another embodiment, a computing device is provided comprising a memory configured to store a trace file listing input/output operations that are sent between a host and a storage system; and a processor in communication with the memory. The processor is configured to receive, from a second computing device, horizontal and vertical dimensions of a display region on the second computing device's display device; determine a prevalent input/output operation for each display area in the display region based on the horizontal and vertical dimensions; and provide the prevalent input/output operation for each display region to the second computing device for display.

In some embodiments, providing the prevalent input/output operation for each display area allows the second computing device to display an address-by-operation graph.

In some embodiments, providing the prevalent input/output operation for each display area allows the second computing device to display a latency-by-operation graph.

In some embodiments, the graph is of a number of a peak input-output operations by second.

In some embodiments, the processor is further configured to receive an identification of a sub-display region in the display region from the second computing device; re-determine the prevalent input/output operation for each display area in the sub-display region; and send, to the second computing device, the re-determined prevalent input/output operation for each display area in the sub-display region.

In some embodiments, the processor is further configured to: receive, from the second computing device, a location of a user-selected display area in the display region; and send to the second computing device, information about one of the following: a number of input/output operation type in the user-selected display area, if there is more than one input/output operation in the user-selected display area; and detail on the input/output operation in the display area, if there is only one operation in the user-selected display area.

In another embodiment, a computing device is provided comprising means for receiving a canvas size from second computing device; means for aggregating storage system operations in a log based on the canvas size, wherein the aggregation aggregates the storage system operations by categories and specifies a most-commonly used category by canvas region; and means for proving the aggregation to the second computing device for display.

In some embodiments, the storage system comprises a three-dimensional memory.

In some embodiments, the storage system is embedded in a host.

In some embodiments, the means for receiving, means for aggregating, and means for proving comprises a processor.

Other embodiments are possible, and each of the embodiments can be used alone or together in combination. Accordingly, various embodiments will now be described with reference to the attached drawings.

Exemplary Embodiments

Figure 1B:
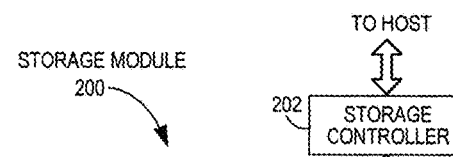
FIG. 1B is a block diagram illustrating an exemplary storage module of an embodiment.
Figure 1B:
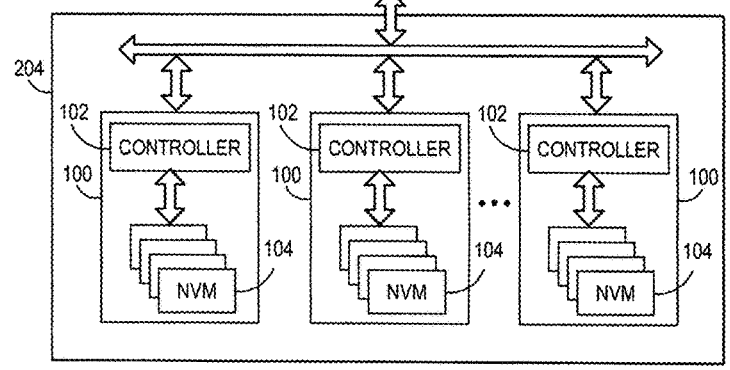
Figure 1C:
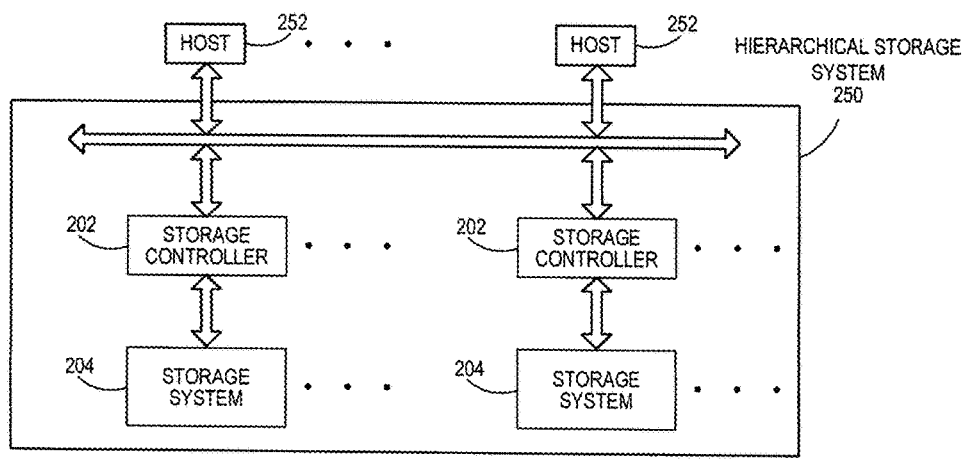
FIG. 1C is a block diagram illustrating a hierarchical storage system of an embodiment.

The following embodiments can be implemented in any suitable type of digital data storage system, including solid-state (e.g., flash memory) storage systems, as well as hard drives. Accordingly, although a solid-state storage system will be used to illustrate the below examples, it should be understood that these embodiments can be implemented using a hard drive or other type of storage system. Accordingly, the use of a solid-state storage system should not be read into the claims, unless expressly recited therein. Solid-state memory systems suitable for use in implementing aspects of these embodiments are shown in FIGS. 1A-1C. FIG. 1A is a block diagram illustrating a non-volatile memory system 100 according to an embodiment of the subject matter described herein. Referring to FIG. 1A, non-volatile memory system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system.

Although, in the example illustrated in FIG. 1A, non-volatile memory system 100 (sometimes referred to herein as a storage module) includes a single channel between controller 102 and non-volatile memory die 104, the subject matter described herein is not limited to having a single memory channel. For example, in some NAND memory system architectures (such as the ones shown in FIGS. 1B and 1C), 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be an NVMe or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
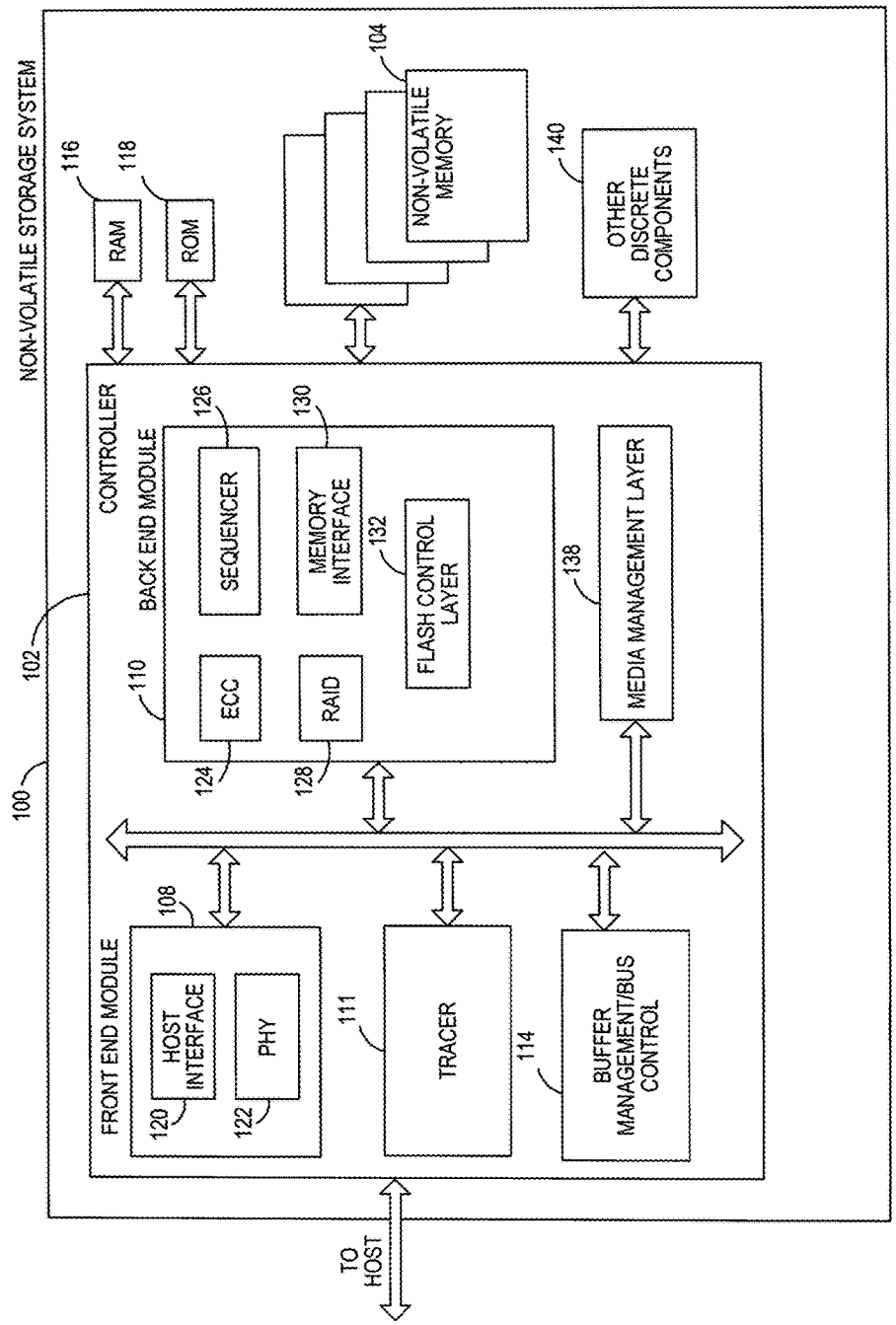
FIG. 2A is a block diagram illustrating exemplary components of the controller of the non-volatile storage system illustrated in FIG. 1A according to an embodiment.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a power-based operation scheduling module 111 configured to execute operations stored in a queue (e.g., RAM 116) in an order in which they are stored in the queue unless performing an operation would exceed a maximum power limit, in which case the power-based operation scheduling module 111 is configured to perform another operation stored in the queue, so the maximum power limit would not be exceeded. These modules will be discussed in more detail below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of system 100 illustrated in FIG. 2A include a tracer 111, which will be discussed in more detail below. In general, a module (including the tracer 111) of the system 100, can be implemented by dedicated hardware formed as part of the memory controller 102 (which may be an Application Specific Integrated Circuit, or ASIC), implemented through software or firmware in the memory controller 102, or implemented through a combination of hardware and software.

The memory system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
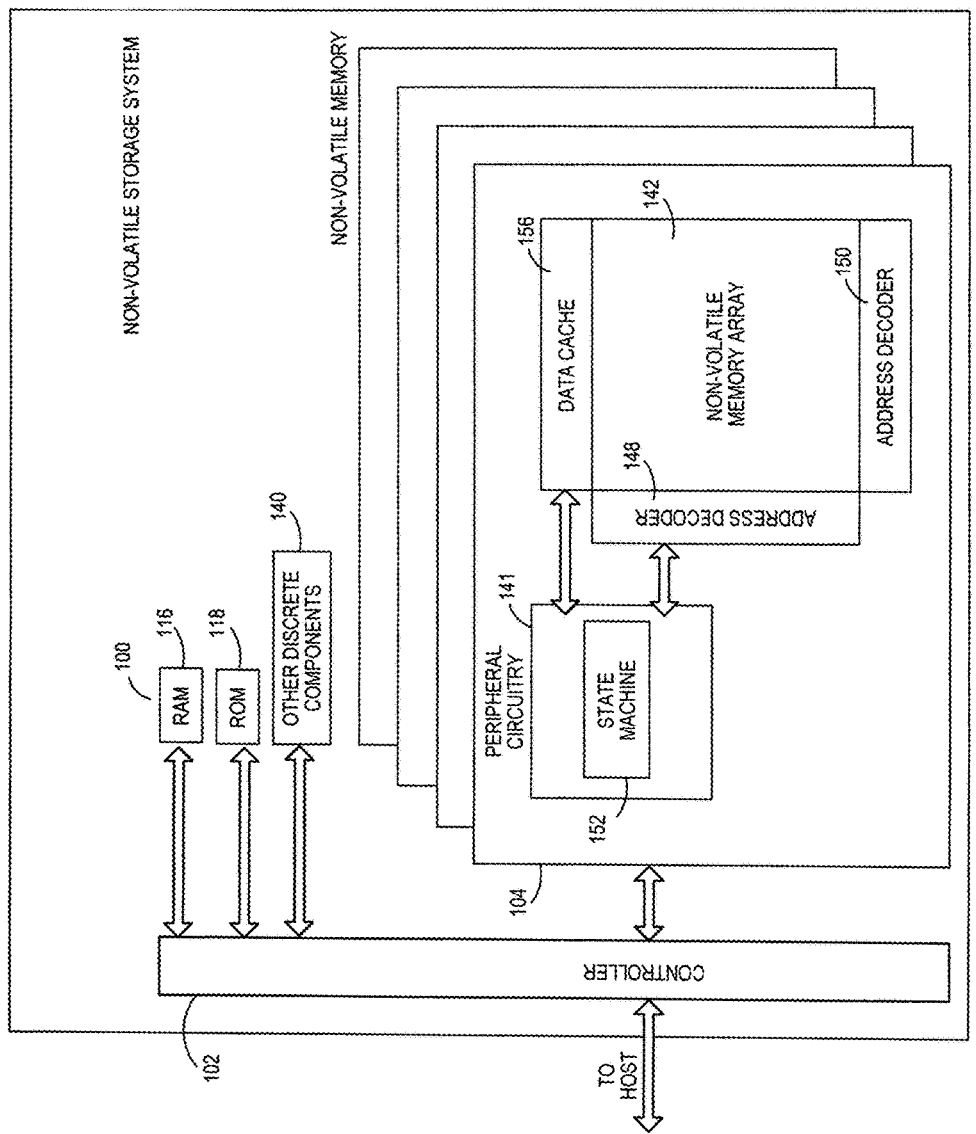
FIG. 2B is a block diagram illustrating exemplary components of the non-volatile memory storage system illustrated in FIG. 1A according to an embodiment.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Non-volatile memory die 104 further includes a data cache 156 that caches data.

The controller 102 of the storage system 100 contains data storage algorithms, and it is often desired to improve such algorithms to help improve efficiency and performance of the storage system 100. One way to make such improvements is to monitor the input/output operations being performed by the storage system 100, as analysis of such operations may provide insight on how the data storage algorithm can be improved. In some environments, the controller 102 of the storage system 100 will already contain the functionality to monitor the input/output operations over a period of time. However, in other environments, such functionality is not present or is present but blocked. In such situations, an entity wishing to monitor input/output operations may introduce a tracer 111 (see FIG. 3) into the storage system 100 to monitor and record the input/output operations (as well as non-input/output operations, such as init, flush, and discard, for example) over a time period (e.g., one week). For example, in one embodiment, a development platform with root access to the kernel of the controller 102 can be used to insert the tracer software/firmware 111. Being in the kernel space, the tracer 111 can have access to the driver and can grab events that are sent between the host (e.g., mobile device operating system) and the storage system 100. When executed, the tracer 111 can record input/output operations and its characteristics (parameters) into a log (e.g., in an in-memory cyclic buffer), which is sometimes referred to herein as a trace file.

Input/output operations can take any suitable form, including, but not limited to (random or sequential) read, (random or sequential) write, erase, move, trim, and discard. Input/output operation characteristics (parameters) can also take any suitable form, including, but not limited to timestamps on initiation and completion, peripheral data (e.g., power state and aggregate queue depth), address in memory space, and size of command.

Figure 3:
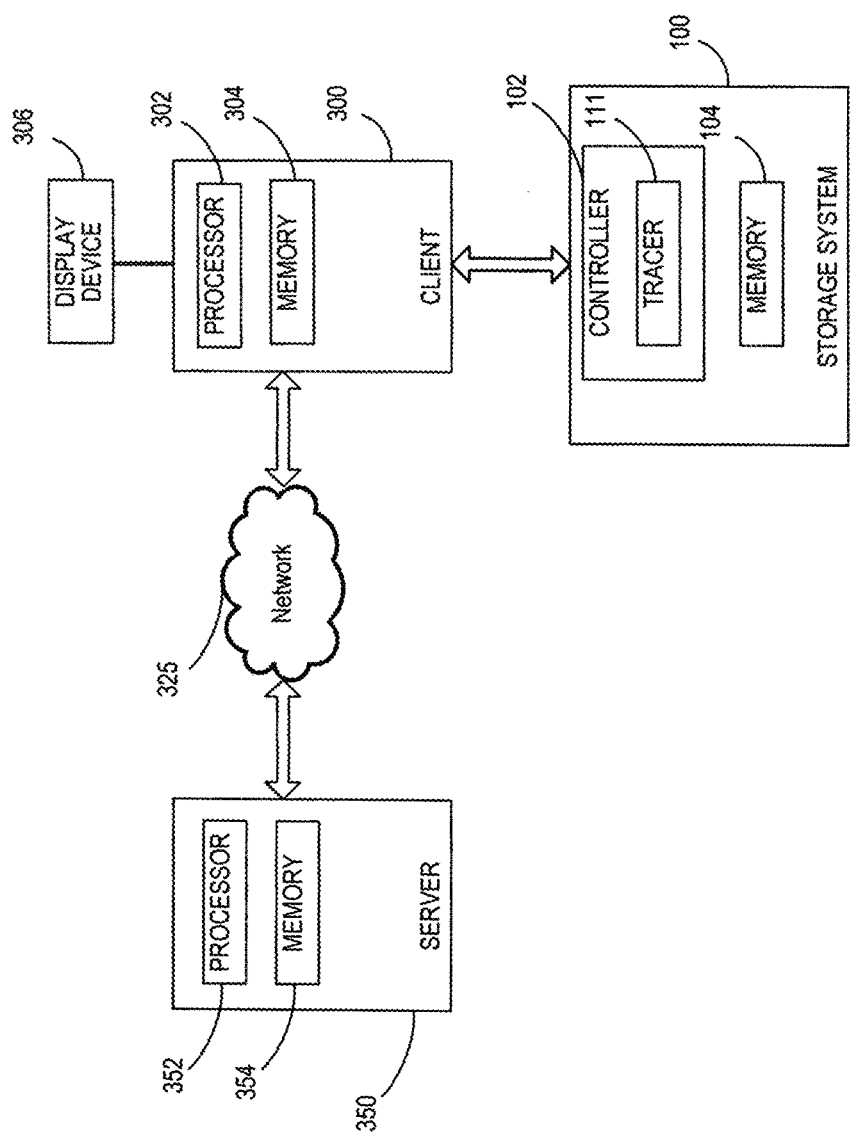
FIG. 3 is an illustration of a networked environment of an embodiment.

A separate computing device (e.g., a PC) (referred to as the client 300 in FIG. 3) can send a command line to the storage system's controller 102 to retrieve the trace file and store it in the computing device's memory 304. (FIG. 3 shows the computing device 100 in direct communication with the storage system 100 (e.g., via a USB cable) to receive the data directly from the storage system 100 without any other intervening components. Other configurations are possible.) In some embodiments, it may be preferred to use the command line instead of having the storage system 100 store the trace file in its memory, as such storing would itself be an input-output operation and, thus, artificial activity. The computing device's processor 302 can then analyze the input-output operations to determine how to improve the storage system's firmware to achieve a better response time.

Often, the analysis of the trace file involves displaying a graph on a display device 306 showing attributes of the various operations. However, one issue with this is that the trace file can be very large (e.g., a few GBs with dozens of millions of operations), and it can be very inefficient to draw millions of data points on the graph. Not only does creating a graph from such a large file take a lot of CPU and GPU time, but the resulting graph with all of its data points may not provide as much usable information as desired. To reduce the number of displayed data points, the computing device 300 can aggregate the operations by type or category. For example, the computing device 300 can sort the operations into read, write, erase, etc. buckets. However, given the large number of operations involved, aggregating the data can still take a large amount of CPU power.

Accordingly, in another embodiment, a server 350 (see FIG. 3) is used to receive the trace file from the computing device/client 300 via a network 325 (e.g., the Internet, a local or wide area network, etc.) and store it in its own memory 354. (It should be noted that while a client-server arrangement is shown in FIG. 3, other distributed processing and big-data multi-node/multi-cluster configurations may be used for processing the data.) The server's processor 352, which can be more powerful than the client's processor 302, can aggregate the data and send the aggregated data to the client 300 to provide visualization of the data. However, the transfer time for this data may be a bottleneck, as may be the processing time for each of these points to provide an optimal analysis service. The server aggregates the original data which results in smaller total amount of data sent to the client so there is no bottle neck. If the server wouldn't aggregate the data, then there would be a bottle neck both on the server side (sending lots of data over the network) and the client side (attempting to draw millions of data points using a conventional PC hardware). That is, if the server 350 aggregates the original (i.e., raw, non-aggregated data), the transfer time would be fast since the aggregation method reduces the amount of data that is sent to the client 300 dramatically, yet without losing any valuable information to the user of the system. However, the server 350 may not be able to aggregate the data without knowing the viewing requirements on the client 300 side (e.g., X/Y ratio and chart area size). So, as discussed in more detail below, the client 300 can provide the server 350 with its "canvas size" before the server 350 sends the aggregated data chunks to the client 300.

To overcome these problems, in one embodiment, the server 350 sends smaller "chunks" of data to the client 300 (instead of the entire set of aggregated data), which the client 300 can draw much faster on a graph. In general, the client 300 sends the size of the graph to the server 350, and the server 350 aggregates data based on this size. So, the client 300 can access the server 350 and request a certain canvas (graph) size, and the server 350 can aggregate the data for the requested canvas size. (The terms "canvas" and "canvas size" are sometimes used herein to refer to a graph and graph size, respectively, to be displayed on the client's display device 306.) So, in one embodiment, the data-store server 350 holds the full set of storage system operations, and the client's user interface component is responsible for drawing points on the display device 306. The client's user interface component can provide the canvas size to the data-store server 350, and the server 350 can return the aggregated data to the client's user interface component. The aggregated data will be much smaller, predictable, and easier to draw by the client 300 than in the prior approaches discussed above.

Figure 4:
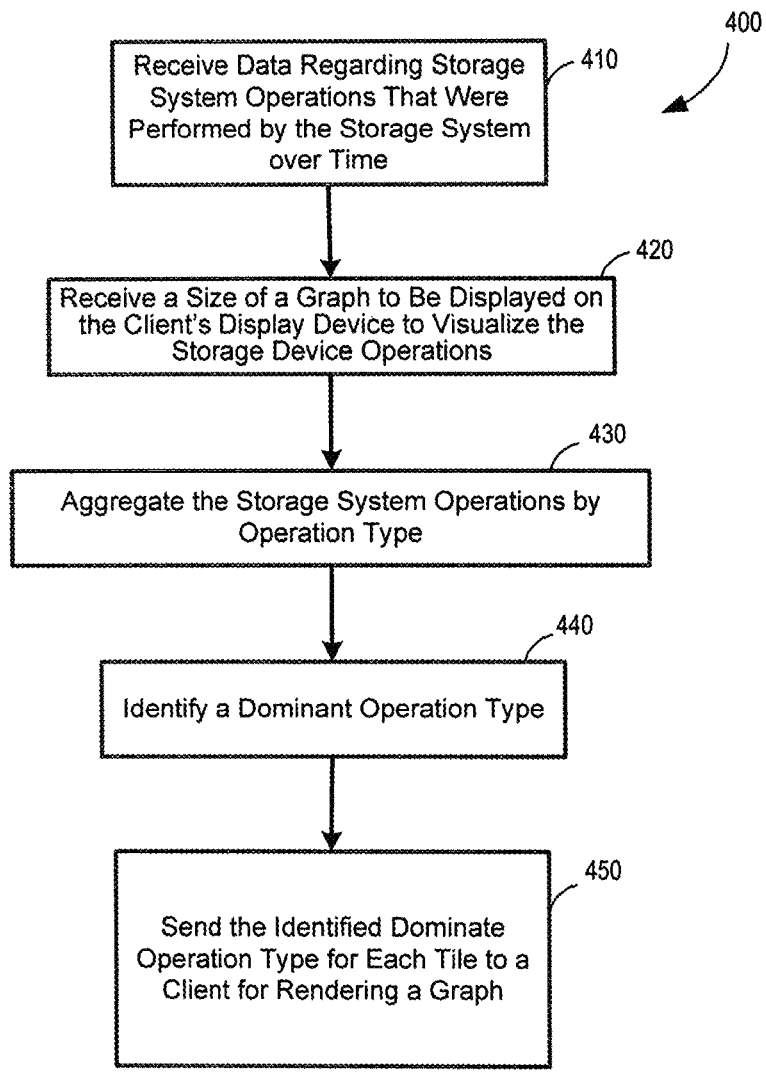
FIG. 4 is a flowchart of a method of an embodiment for interactive aggregation and visualization of storage system operations.

FIG. 4 is a flowchart 400 that illustrates this method of interactive aggregation and visualization of storage system operations. As shown in FIG. 4, the server 350 receives from the client 300 data regarding storage system operations that were performed by the storage system 100 over time (act 410). In this embodiment, each storage system operation is classified according to an operation type (e.g., sequential or random write, sequential or random read, discard, etc.), which can also include associated parameters and characteristics, such as, but not limited to, address space and duration. As discussed above, this data can take the form of a log or trace file received from the storage system 100 by the client 300.

Next, the server 350 receives from the client 300 a size of a graph to be displayed on the client's display device 306 to visualize the storage device operations (act 420). The size of the graph (canvas size) can be communicated in any suitable way. For example, in one embodiment, the graph is defined by a number of tiles, e.g., in x and y directions. As used here, a tile can refer to the smallest displayable point on the display device 306 (e.g., a pixel) or can be an area of more than the smallest displayable point (e.g., more than one pixel). The size of the graph can be communicated to the server 350 automatically as part of the negotiation between the client 300 and the server 350, such as when the client 300 is implementing a web browser.

The tile (sometimes referred to as a "display area") can represent one or more storage system operations, or none at all. Of course, many alternatives can be used. For example, instead of the client 300 specifying the number of tiles, the client 300 can provide the horizontal and vertical dimensions of a display region on its display device 306 using some other metric. However, the tile concept will be used to illustrate this particular embodiment.

Returning to FIG. 4, for each tile, the server 350 aggregates the storage system operations by operation type (act 430) and identifies a dominant operation type (act 440). The server 350 then sends the identified dominate operation type for each tile to the client 300 (act 450), which would render the graph on the display device 306.

In this embodiment, the aggregation is done based on the requested number of tiles (canvas size). For example, consider the situation in which the trace file contains 2,500,000 data points. In a normal use case, these data points would be spread throughout a graph, with a lot of hot spots (clusters of data points). By knowing the canvas size, the server 350 can aggregate the data, so a given tile may represent many data points. By picking the dominant operation type, the server 350 lets the tile represent that storage system operation. For example, if a read command was the prevalent storage system operation, the server 352 can indicate that the tile to be displayed at a particular display region should represent a read command. So, if the client 300 requests a graph with the logical resolution of 200 tiles by 150 tiles, the server 350 would return 30,000 data points instead of the entire set of 2,500,000 data points, which results in less data being transferred to the client 300, less CPU and GPU requirements of the client 300.

Figure 5:
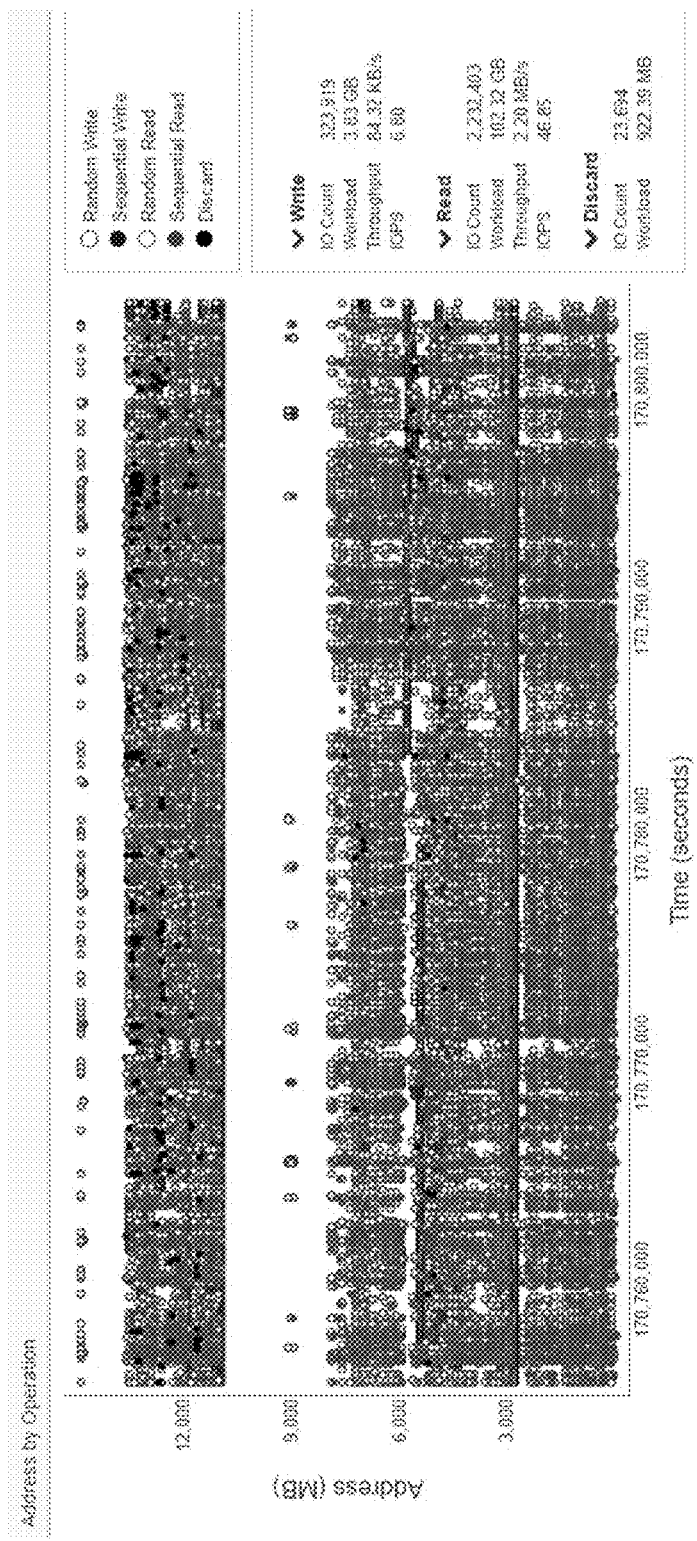
FIG. 5 is an address-by-operation graph of an embodiment.

FIG. 5 is an example graph (here, an address-by-operation graph) rendered by the client 300. It should be noted that the shape, color, and any other characteristic used to mark the selected dominant type (shown in this and the other graphs) may vary.

Figure 6:
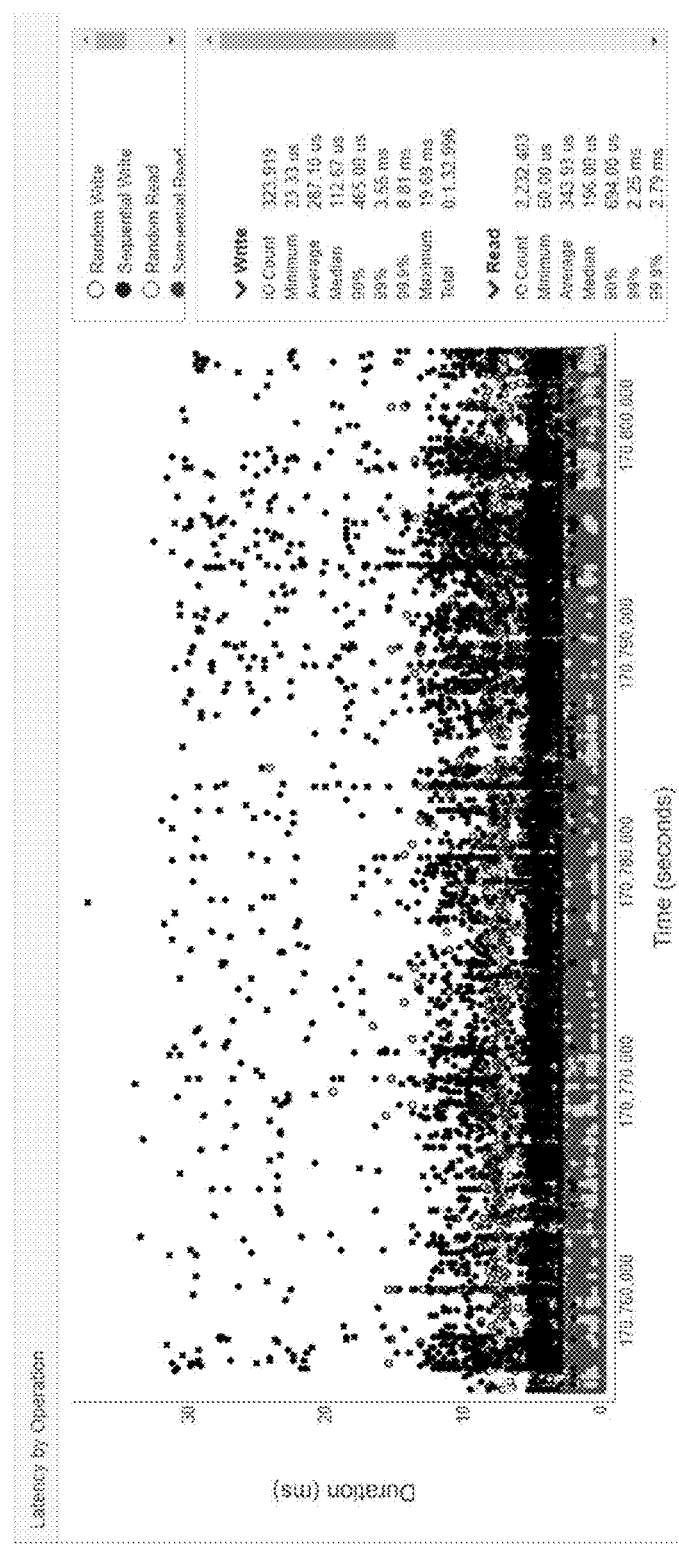
FIG. 6 is a latency-by-operation graph of an embodiment.

In FIG. 5, the graph shows read operations in red circles and write operations in blue circles, with a circle being closed if the operation is sequential and the circle being open if the operation is random. The x axis is time, and the y axis is address. As shown in FIG. 5, most of the dominate operations are sequential reads, with a lot of white space (no activity) in the address space around 9,000 MB. In this example, by using the aggregation and visualization techniques of this embodiment, the server 300 can hold 2,580,016 data points, but, after data aggregation, the client receives only 29,160 points. Of course, this is just one example, and other types of graphs can be drawn. For example, FIG. 6 shows a latency-by-operation graph. In this example, the server 350 holds 2,680,475 points, but, after aggregation, the client 300 receives only 13,717 points.

Figure 7:
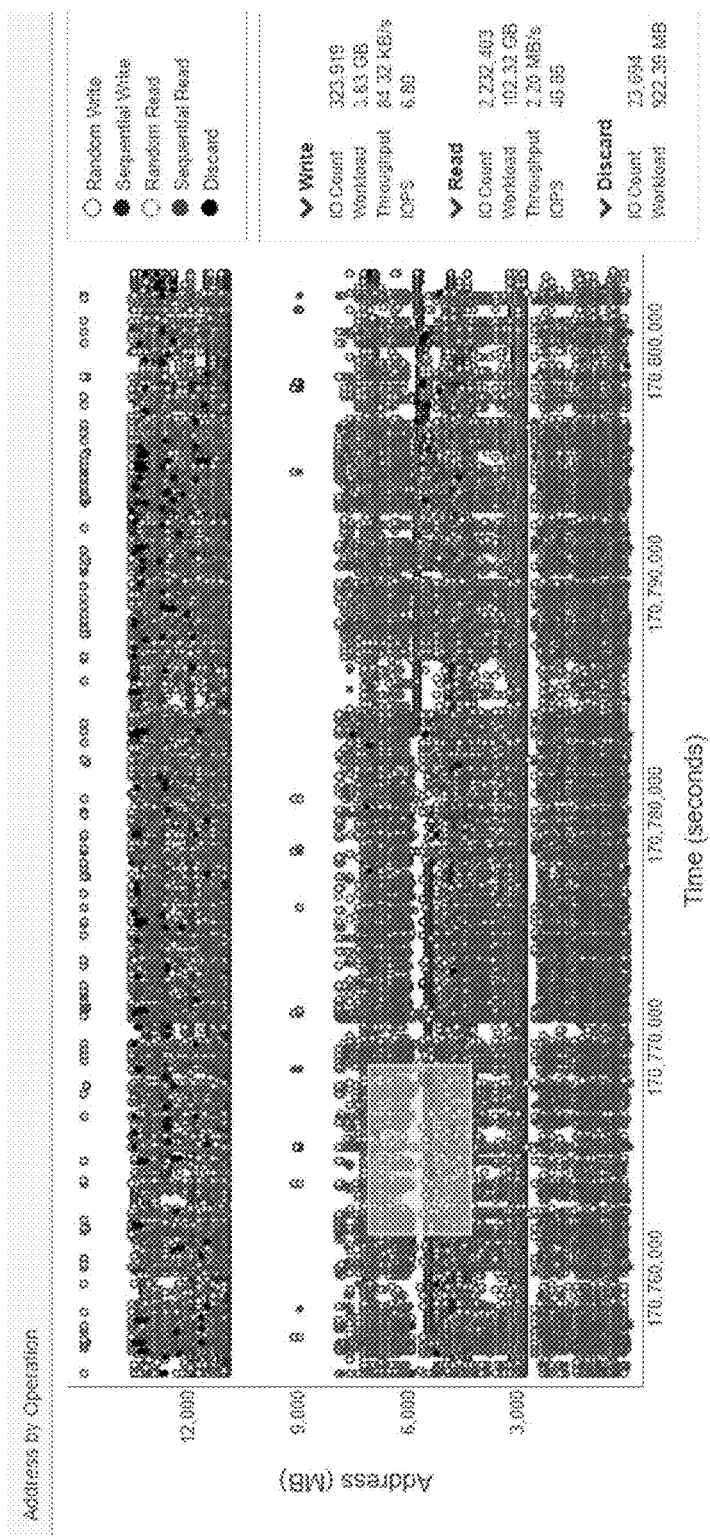
Figure 8:
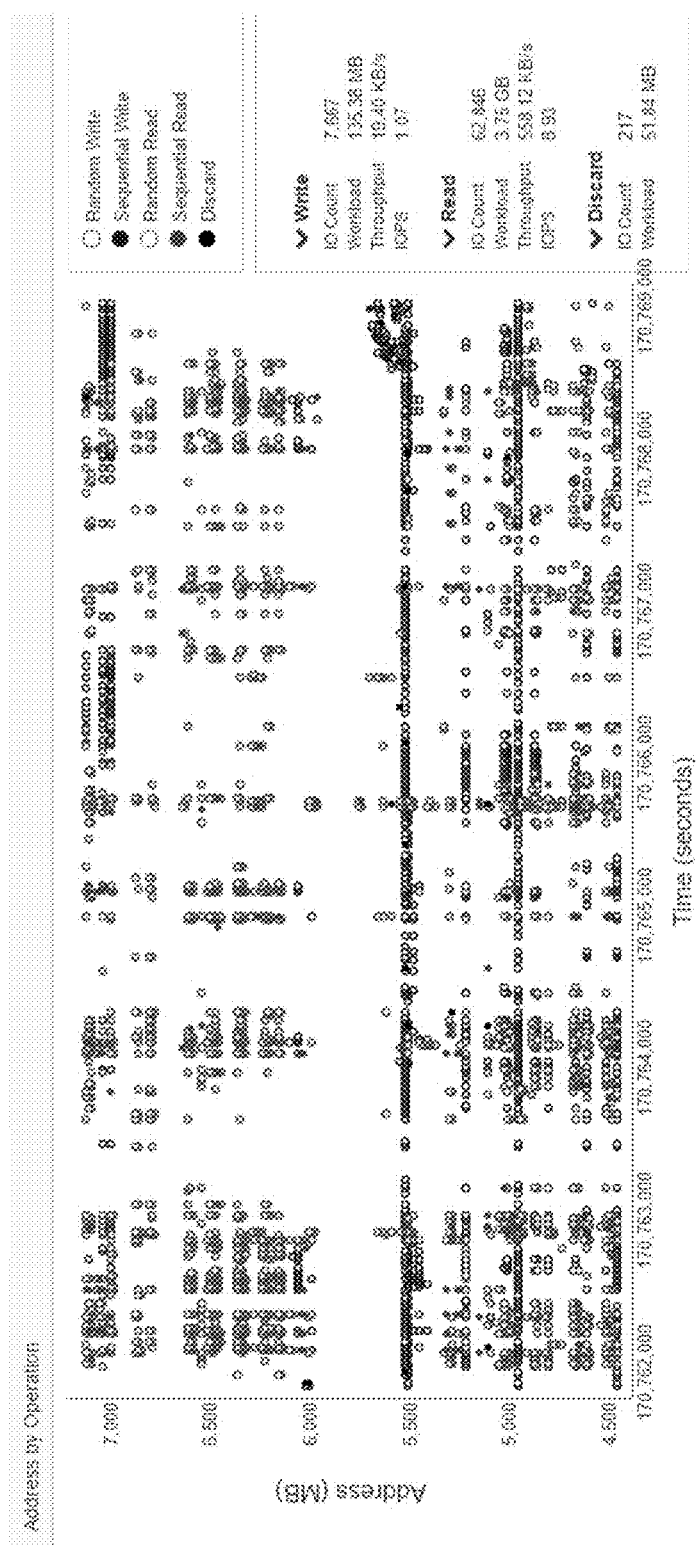
FIG. 8 is an illustration of the zoomed-in area of FIG. 7.

Although the dominant storage system operation is represented in the tile in this example, it may be preferred to allow the user insight into the data "underneath" the visual representation on the graph. So, one embodiment allows a "zooming in" ability. For example, FIG. 7 shows a user wants to zoom-in in the yellow rectangular area. When a zoom occurs, the client 300 can send the zoom coordinates to the server 350, and the server 350 can re-aggregate and re-identify the dominate storage device operation type based on those coordinates, sending the new data to the client 300 for display. In such situations, the canvas size usually remains the same, so the server just needs to send the new selected dominant type per the new tile size. It should be noted that by zooming in, new information with higher resolution may be presented on the display, as shown in FIG. 8.

Figure 9:
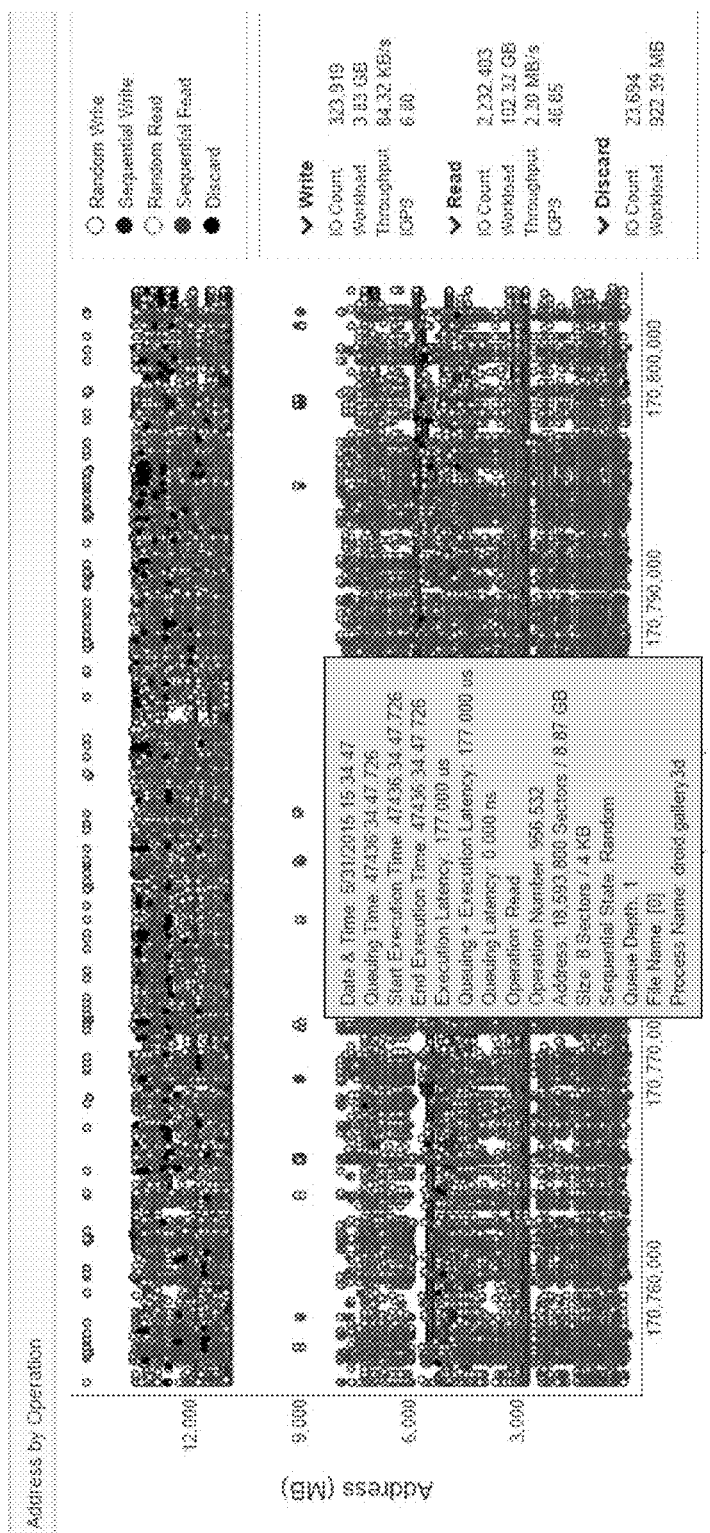
FIG. 9 is an address-by-operation graph of an embodiment with a tool-tip display showing details of an operation.
Figure 10:
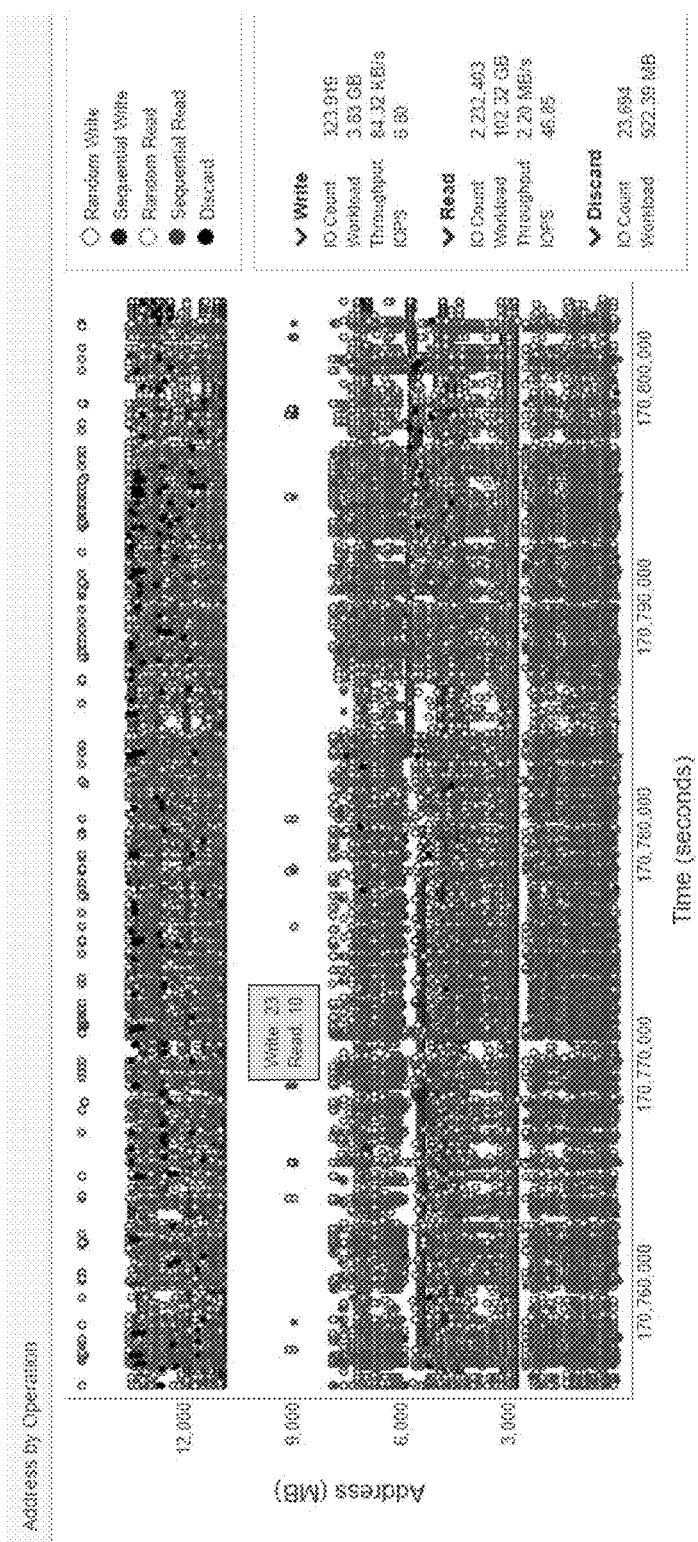
FIG. 10 is an address-by-operation graph of an embodiment with a tool-tip display of how many operations of each type are in a selected tile.

In another embodiment, a tool tip feature is provided to provide additional information about what is represented by the tile when the user moves a cursor (or other user interface selection element) over a tile. For example, as shown in FIG. 9, if a tile only represents one operation, the tooltip can display full details of that operation. As another example, as shown in FIG. 10, if the tile represents more than one operation, the tooltip can display how many operations of each type are in the tile. Such expanded information may be sent from the server 350 to the client 300 on demand (e.g., after the user selects a tile) in order to minimize data transfer before the actual selection. Alternatively, the information can be sent earlier to the client 300. Optionally, the non-aggregated data represented by the aggregated point may be visualized or be presented as raw data by the tool tip.

Figure 11:
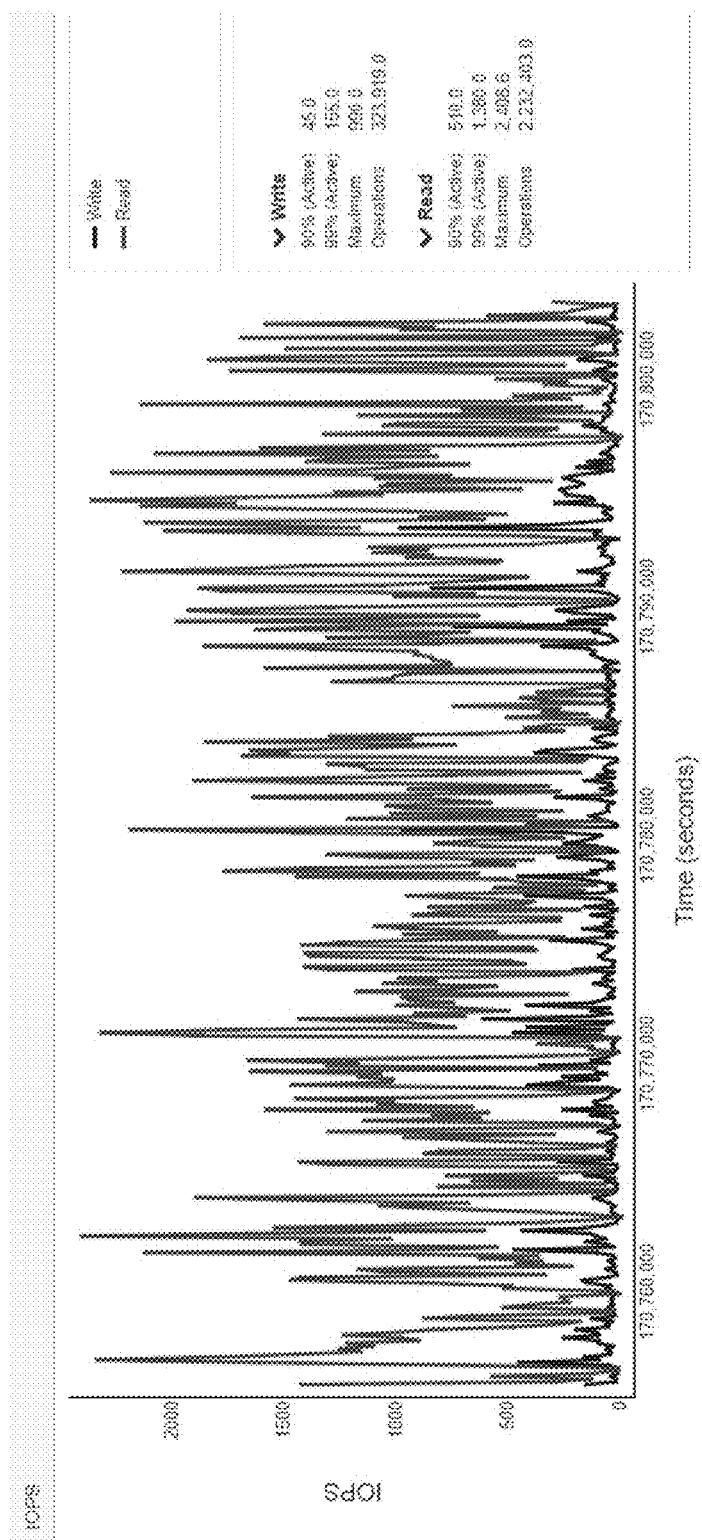
FIG. 11 is an input-output-operation-by-second graph of an embodiment.

As another example of a possible graph that can be displayed, FIG. 11 shows one-dimensional graph where the tile is a 1D time axis. Here, the graph is of the number of input-output operations per second (IOPS). This embodiment may involve selecting the peak value per tile by the server 350, where the peak value plot highlights and magnifies the signal requested information in contrast to averaging the data over the tile. It should be noted that the features and characteristics explained above for the two-dimensional graphs also apply to the one-dimensional graph.

There are several alternatives associates with these embodiments. For example, a hybrid system may be provided where part of the data aggregation is performed by the client processor (not all by the server processor). In such a hybrid system, the client can ask the server for data for a larger canvas size than the actual canvas size it uses (e.g., 800 horizontal by 700 vertical tile sizes where typically the value is 500 horizontal by 500 vertical). Accordingly, more data will be transferred from the server to the client, allowing the client to perform next additional data aggregation and visualizing different size canvas to the user without the need to access the server. By using partial client-side aggregation the data would be received in higher resolution from the server (but it's still much smaller than the raw data). An advantage of this embodiment is that the client would not need to ask the server for data each time the graph on the client is resized.

Also, while the above embodiments used aggregation for identifying the dominant storage operation type, it should be noted that this is only one of the dimensions that the system can aggregate information for. For example, the system can also aggregate by the operation address continuity type (e.g., sequential, random). In general, the aggregation method strongly depends on the specific graph data that is being prepared for sending from the application server to the client.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for aggregation of storage system operations, the method comprising:

performing in a server:
receiving data regarding X number of storage system operations that were performed by a storage system over time, wherein each storage system operation is classified according to an operation type;
receiving, from a client, a size of a graph to be displayed on the client's display device to visualize the storage device operations, wherein the size of the graph includes Y number of tiles, wherein X>Y;
aggregating the storage system operations based on the size of the graph by:
determining which of the X number of storage system operations belong to each of the Y number of tiles, wherein each of the Y number of tiles comprises a plurality of different operation types; and
identifying a dominant operation type for each tile, wherein each tile is identifying by its identified dominant operation type even though each tile comprises a plurality of different operation types; and
sending, to the client, the identified dominant operation type for each of the Y number of tiles instead of the plurality of different operation types for each of the Y number of tiles;
wherein having the server aggregate the storage system operations based on the size of the graph results in less processing by the client than if the client were to aggregate the storage system operations; and wherein sending the client the identified dominant operation type for each of the Y number of tiles results in a smaller amount of data sent to the client than sending the plurality of different operation types for each of the Y number of tiles to the client.

2. The method of claim 1, wherein the graph is an address-by-operation graph.

3. The method of claim 1, wherein the graph is a latency-by-operation graph.

4. The method of claim 1, wherein the graph is of a number of a peak input-output operations by second.

5. The method of claim 1 further comprising:
receiving zoom-in coordinates from the client;
for each tile within the zoom-in coordinates, re-identifying the dominant operation type; and
sending, to the client, the re-identified dominant operation type for each tile within the zoom-in coordinates.

6. The method of claim 1 further comprising:
receiving, from the client, a location of a user-selected tile on the graph; and
sending, to the client, information about one of the following:
a number of storage system operations per operation type in the user-selected tile, if there is more than one operation in the user-selected tile; and
detail on the operation in the user-selected tile, if there is only one operation in the user-selected tile.

7. The method of claim 1, wherein the storage system comprises a three-dimensional memory.

8. The method of claim 1, wherein the storage system is embedded in a host.

9. A computing device comprising:
a memory configured to store a trace file listing X number of input/output operations that are sent between a host and a storage system; and
a processor in communication with the memory, wherein the processor is configured to:
receive, from a second computing device, horizontal and vertical dimensions of a display region on the second computing device's display device, wherein the horizontal and vertical dimensions include Y number of display areas, wherein X>Y;
aggregate the input/output operations based on the horizontal and vertical dimensions by:
determining which of the X number of input/output operations belong to each of the Y number of display areas, wherein each of the Y number of display areas comprises a plurality of different input/output operations; and
determining a prevalent input/output operation for each display area even though each display area comprises a plurality of different input/output operations; and
provide the prevalent input/output operation for each display area to the second computing device for display instead of providing the plurality of different input/output operations for each display area.

10. The computing device of claim 9, wherein providing the prevalent input/output operation for each display area enables the second computing device to display an address-by-operation graph.

11. The computing device of claim 9, wherein providing the prevalent input/output operation for each display area enables the second computing device to display a latency-by-operation graph.

12. The computing device of claim 11, wherein the graph is of a number of a peak input-output operations by second.

13. The computing device of claim 9, wherein the processor is further configured to:
receive an identification of a sub-display region in the display region from the second computing device;
re-determine the prevalent input/output operation for each display area in the sub-display region; and
send, to the second computing device, the re-determined prevalent input/output operation for each display area in the sub-display region.

14. The computing device of claim 9, wherein the processor is further configured to:
receive, from the second computing device, a location of a user-selected display area in the display region; and
send, to the second computing device, information about one of the following:
a number of input/output operation type in the user-selected display area, if there is more than one input/output operation in the user-selected display area; and
detail on the input/output operation in the display area, if there is only one operation in the user-selected display area.

15. The computing device of claim 9, wherein the storage system comprises a three-dimensional memory.

16. The computing device of claim 9, wherein the storage system is embedded in the host.

17. A computer-readable storage medium storing computer-readable program code that, when executed by a processor, causes the processor to:
receive a canvas size from a computing device;
aggregate X number of storage system operations in a log based on the canvas size, wherein the canvas size includes Y number of display areas, wherein X>Y, wherein the aggregation comprises:
determining which of the X number of storage system operations belong to each of the Y number of display areas, wherein each of the Y number of display areas comprises a plurality of different operation types; and
determining a most-commonly-used operation type for each display area even though each display area comprises a plurality of different operation types; and
provide the aggregation to the second computing device for display.

18. The computer-readable storage medium of claim 17, wherein the storage system operations are performed in a storage system comprising a three-dimensional memory.

19. The computer-readable storage medium of claim 17, wherein the storage system operations are performed in a storage system is embedded in a host.

20. The computer-readable storage medium of claim 17, wherein the computer-readable program code further causes the processor to perform the recited steps using a web application.

21. A server comprising:
means for receiving data regarding X number of storage system operations that were performed by a storage system over time, wherein each storage system operation is classified according to an operation type;
means for receiving, from a client, a size of a graph to be displayed on the client's display device to visualize the storage device operations, wherein the size of the graph includes Y number of tiles, wherein X>Y;
means for aggregating the storage system operations based on the size of the graph by:

determining which of the X number of storage system operations belong to each of the Y number of tiles, wherein each of the Y number of tiles comprises a plurality of different operation types; and identifying a dominant operation type for each tile, wherein each tile is identifying by its identified dominant operation type even though each tile comprises a plurality of different operation types; and means for sending, to the client, the identified dominant operation type for each of the Y number of tiles instead of the plurality of different operation types for each of the Y number of tiles;

wherein having the server aggregate the storage system operations based on the size of the graph results in less processing by the client than if the client were to aggregate the storage system operations; and wherein sending the client the identified dominant operation type for each of the Y number of tiles results in a smaller amount of data sent to the client than sending the plurality of different operation types for each of the Y number of tiles to the client.

\* \* \* \* \*